(12) United States Patent
Philippe et al.

(10) Patent No.: US 11,366,273 B2
(45) Date of Patent: Jun. 21, 2022

(54) ASSEMBLY FOR ASSEMBLING OPTICAL FIBER WITH AT LEAST TWO PAIRS OF MPO CONTACTS

(71) Applicant: SOURIAU, Versailles (FR)

(72) Inventors: Alain Philippe, Changé (FR); Serge Leroyer, Le Mans (FR); Sebastien Claudot, Thorigné-sur-Dué (FR)

(73) Assignee: SOURIAU, Versailles (FR)

( * ) Notice: Subject to any disclaimer, the term of this patent is extended or adjusted under 35 U.S.C. 154(b) by 0 days.

(21) Appl. No.: 17/013,789

(22) Filed: Sep. 7, 2020

(65) Prior Publication Data

US 2021/0072465 A1     Mar. 11, 2021

(30) Foreign Application Priority Data

Sep. 5, 2019   (FR) ..................... 19 09798

(51) Int. Cl.
  *G02B 6/38*     (2006.01)
(52) U.S. Cl.
  CPC ......... *G02B 6/3825* (2013.01); *G02B 6/3831* (2013.01); *G02B 6/3893* (2013.01)
(58) Field of Classification Search
  CPC .. G02B 6/3831; G02B 6/3893; G02B 6/3825; G02B 6/00
  USPC ....................................................... 385/139
  See application file for complete search history.

(56) References Cited

U.S. PATENT DOCUMENTS

| | | | | |
|---|---|---|---|---|
| 10,234,635 B1* | 3/2019 | Fabian | ................. | G02B 6/3817 |
| 10,591,681 B2* | 3/2020 | Smith | ................. | G02B 6/3897 |
| 2011/0222819 A1* | 9/2011 | Anderson | ............ | G02B 6/3879 |
| | | | | 385/78 |
| 2012/0039569 A1* | 2/2012 | Kevern | ................. | G02B 6/3897 |
| | | | | 385/56 |
| 2013/0064506 A1* | 3/2013 | Eberle, Jr. | ............ | G02B 6/4453 |
| | | | | 385/49 |
| 2014/0133806 A1* | 5/2014 | Hill | ...................... | G02B 6/3826 |
| | | | | 385/77 |
| 2016/0131849 A1* | 5/2016 | Takano | ................. | G02B 6/3881 |
| | | | | 385/60 |
| 2017/0227720 A1* | 8/2017 | Lin | ...................... | G02B 6/3885 |

(Continued)

FOREIGN PATENT DOCUMENTS

| | | | | |
|---|---|---|---|---|
| EP | 3414608 B1 * | 2/2021 | | |
| WO | 2016/007491 A1 | 1/2016 | | |
| WO | WO-2020160254 A1 * | 8/2020 | ........... | G02B 6/3825 |

*Primary Examiner* — Kaveh C Kianni (74) *Attorney, Agent, or Firm* — Im IP Law; Chai Im; C. Andrew Im (57) ABSTRACT

An assembly for assembling optical fiber with at least two pairs of MPO contacts. The optical contacts being of the multifiber push-on type. The assembly includes a socket including MPO contacts cooperating with a plug. The plug includes, through axial openings configured to receive the MPO contacts, a first positive-location element positioned in each axial opening of the plug and a second positive-location element positioned on each corresponding MPO contact. A holding element configured to hold the MPO contacts in the plug. The plug shape cooperates with the shape of the socket to ensure coupling thereof. The socket includes locking elements to lock the MPO contacts. Each MPO contact of the plug is locked with the corresponding MPO contact in the socket.

9 Claims, 9 Drawing Sheets

(56) References Cited

U.S. PATENT DOCUMENTS

2020/0088949 A1* 3/2020 Terashima ............. G02B 6/385
2020/0333537 A1* 10/2020 Gniadek .............. G02B 6/3825

* cited by examiner

ASSEMBLY FOR ASSEMBLING OPTICAL FIBER WITH AT LEAST TWO PAIRS OF MPO CONTACTS

RELATED APPLICATION

This application claims priority from French Patent Application No. 19 09798 filed Sep. 5, 2019, which is incorporated herein by reference in its entirety.

FIELD OF THE INVENTION

The present invention relates to an assembly for assembling optical fiber for simultaneously connecting at least two pairs of MPO contacts. A pair of MPO contacts means that an MPO contact is situated in a socket and that another MPO contact is situated in a plug.

The present invention applies in particular to applications for transmission of data in aeronautics.

The need consists in simplifying and making secure the simultaneous connection of a plurality of quick-locking optical multichannel contacts of the MPO (multifiber push-on) type while keeping the locking and guidance elements (adapter and MPO contacts) conforming to the standard cited below and also making it possible to re-use standard MPO products.

BACKGROUND OF THE INVENTION

The MPO contact makes it possible to connect from 8 to 48 optical fibers simultaneously by means of a quick-locking system of the "push pull" type implemented by means of clips situated in the MPO adapter and the complementary shape situated in the MPO contact. Release of the MPO contact is achieved by manual pulling on the locking ring of the MPO contact. The contact and the MPO adapter thereof are defined in the standards IEC 61754-7 or IEA/TIA 604-5 (FOCIS 5) and were initially developed for datacenter markets. It is at the present time widespread in various markets and available from several manufacturers such as SENKO® or US CONNEC®. The standard and the cross tests between manufacturers have made it possible to make the performance of the optical connection reliable and to develop an extensive range of complementary components: control means, wiring, cleaning.

For integration thereof in an aircraft, the optical socket must offer a design close to a standard connector of the EN4165 or ARINC836 type. The U.S. Pat. No. 10,234,635 describes an EN4165 connector including two subassemblies using specific optical contacts.

The prior art shows a large number of connectors not initially designed for optics, which has the major drawback of not reusing the principle of guidance and locking of MPO contacts.

The system for aligning the two parts of the connector involves a plurality of parts, which gives rise to a risk for the quality of the alignment of the MT ferrules. Qualifying manufacturers whose connectors must be intermarriable is complicated because of the difficulty of translating in the standards the requirement of guidance necessary for the optical performance. Only cross tests over a sufficiently long period for taking into account manufacturing variables would make it possible to guarantee this performance, which is too expensive and lengthy. The obligation to use specific optical tools also obliges the aircraft manufacture to invest massively for equipping all these aircraft assembly and maintenance centers.

WO 2016/007491, FIG. 8, FIG. 9 and FIG. 10, describe in the following order: a plug assembly comprising two MPO contact subassemblies each including an MT ferrule; a plug assembly architecture with a cylindrical volume; an assembly of two subassemblies for contact by fitting together.

This plug assembly has, at a minimum, the following drawbacks: having to unpack the assembly in order to take out at least one MPO contact subassembly; a circular-shaped plug assembly, necessary for coupling by screwed connection to a socket, receiving rectangular-shaped contact subassemblies. This operation is therefore complex. The number of parts in the plug and socket assembly is large, with thirteen parts used in addition to the MPO contacts.

US 2012/0039569 describes a connector making it possible to hold the MPO contacts in the socket and in the plug by virtue of their retention system and to couple them by means of a specific interface.

The drawback of this solution is that locking is provided by a specific clamping. Moreover, the development and qualification of a specific locking solution gives rise to high costs for 100% guaranteeing intermarriability and interchangeability between manufacturers.

One of the aims of the invention is to use the locking elements present on the MPO contacts and adapters, which makes it possible to reuse the accessories developed for the MPO contacts (inspection, etc.).

OBJECT AND SUMMARY OF THE INVENTION

The present invention aims to remedy these drawbacks with an innovative approach consisting of reusing the MPO contact and the dimensions of the MPO adapter defined in the standard in order to guarantee for the aeronautical customer a tried and tested locking and several sources of procurement, by adding a simple and inexpensive part enabling a plurality of MPO contacts to lock together and unlock simultaneously in a single movement of the plug and to provide additional functions not present in standardized MPO contacts.

To this end, the present invention relates to an assembly for assembling optical fiber with at least two pairs of MPO contacts, for optical contacts of the multifiber push-on type, defined in accordance with IEC 61754-7, the assembly includes a socket including MPO contacts and MPO adapters cooperating with a plug, remarkable in that:
the plug includes:
through axial openings intended to receive the MPO contacts;
a first positive-location element positioned in each axial opening of the plug and a second positive-location element positioned on each corresponding MPO contact;
an element for holding the MPO contacts adapted to hold the MPO contacts in the plug;
a shoulder adapted for simultaneously releasing the release mechanism of the MPO contacts during traction performed on the plug, the form of the shoulder cooperates with a shoulder on the locking ring of the MPO contact;
the plug shape cooperates with the shape of the socket in order to provide coupling thereof and to guide the MPO contacts during coupling;
the socket includes MPO adapters in which each MPO contact of the plug is locked with the corresponding MPO contact in the socket.

The dimensions of the MPO adapters and of the MPO contacts being in accordance with the standard, good alignment of the MPO contacts contained in the socket with the MPO contacts of the plug is thus ensured. The MPO contacts of the plug are locked by the locking element of the MPO adapters of the socket.

The socket has axial openings complying with the standard for MPO adapters and fulfilling the functions of guiding and holding the MPO contacts, and an external shape complementary to that of the plug to allow guidance of the plug.

By virtue of these provisions, a single-piece plug enables an operator to connect a plurality of MPO contacts in a single movement of the plug. Thus it is ensured that all the MPO contacts are properly held.

The axial opening includes a shoulder associated with a holding element, cooperating with a shoulder of the locking ring of each MPO contact making it possible to hold the MPO contact in the axial opening of the plug.

During traction on the plug, the shoulder transfers the traction simultaneously onto the locking ring of the MPO contacts, which makes it possible to release the mechanism for unlocking of all the MPO contacts with the associated MPO adapters in a single movement.

The invention is advantageously implemented according to the embodiments and variants disclosed below, which are to be considered individually or in accordance with any technically effective combination.

In one embodiment, the holding element is a retention clip molded with the plug and positioned at each axial opening. This clip can bear on a spacer at the rear of the MPO contact or a rear MPO contact sleeve adapted for this purpose. The material of the plug is normally a hard thermoplastic.

In one embodiment, each MPO contact of the plug includes a spacer, the first positive-location element is positioned on said spacer.

In another variant of an embodiment, the spacer is integrated in the main body of the MPO contact or on the sleeve. In this case, the positive-location element is also positioned on the body of the MPO contact, the sleeve or on the locking ring.

In one embodiment and in particular when the number of MPO contacts to be locked is great, the spacer is flexible to enable the longitudinal clearances between all the MPO contacts to be taken up and to ensure that, at the end of the movement of the plug, all the MPO contacts are locked.

In one embodiment, the axial openings in the plug are slightly offset in order to have successive locking and unlocking of the MPO contacts. This arrangement makes it possible to limit the locking and unlocking force but makes it necessary to thicken the adaptive part or to increase the flexibility thereof.

In one embodiment, the plug is produced from a flexible material of the elastomer type, which makes it possible to achieve the holding of the MPO contacts by radial deformation of the axial opening.

In one embodiment, the axial opening includes a shoulder cooperating with a part of each MPO contact in order to lock the end of the MPO contact in the axial opening of the plug, said MPO contact includes a locking ring positioned in the axial opening and inserted on the other side of the insertion of each MPO contact in order to hold the MPO contacts.

In one embodiment, the first positive-location device is a rib and the second positive-location device is a recess of complementary shape to that of the rib.

In one embodiment, the plug includes a protective film for the MPO contacts. Thus, the protective film is for single use and guarantees the cleanliness of the contact.

In one embodiment, the plug includes a grooved part facilitating gripping.

In one embodiment, the plug includes a seal positioned around the MPO contacts and provides impermeability when the plug and socket are coupled. The seal may be supplemented by a membrane of the bellows type acting between the cables of the contacts and the plug or by an adaptation of the MPO contact making it possible to achieve a radial seal between the rear of the MPO contact and the rear part of the radial opening of the plug. When the plug is produced from flexible material, the flexibility of the plug can make it possible to fulfil the sealing function with the socket and with the rear of the MPO contact without the addition of an additional part.

By virtue of these provisions, the solution is made impervious, with protection for protecting the contacts of the MPO type and the front face thereof comprising the terminations of the optical fibers.

In one embodiment, the plug includes a third positive-location element positioned on the external surface cooperating with a fourth positive-location element positioned on the socket.

The plug and the socket include recesses and ribs of complementary shape for effecting a positive location additional to that of the contacts, with a design substantially similar to the EN4165 or ARINC836 standard, in order to provide the correct pairing of the multiple connectors provided in the network architecture.

In one embodiment, the socket includes a separator plate, each side of which includes at least two openings adapted to receive an MPO contact part of a plug. Thus it is necessary to have a plug on each side in order to produce the MPO contact assembly.

The plug includes a sliding guide for easily coupling together two identical plugs by means of a socket including a separator plate hereinafter referred to as an extension socket.

BRIEF DESCRIPTION OF THE DRAWINGS

Other advantages, aims and features of the present invention emerge from the following description given, for an explanatory and in no way limitative purpose, with regard to the accompanying drawings, wherein.

DETAILED DESCRIPTION OF THE EMBODIMENTS

The following explanation relates to certain references related to the figures detailed below. The purpose of this explanation is to give the principle of the invention.

According to a first embodiment, the plug 21 is molded from a rigid thermoplastic material and contains two MPO contacts 22b, each provided with a spacer 26 for supporting the retention clips 25 at the rear of the plug 21.

According to a second embodiment, the plug 21 is flexible and includes forms in relief inscribed in the flexible material for creating a retention clip.

The rear stop of the MPO contacts being provided by the retention clips, the front stop of the MPO contacts is implemented by the shoulder 28 of the plug that prevents forward translation of the locking ring 27 of the MPO contact.

The MT ferrules belonging to the MPO contacts 22 are "mechanically" protected by the profile of the plug 21 according to the first embodiment or the second embodiment.

The MT (the acronym for "mechanical transfer") ferrules are a mechanical assembly with a light spring and a low profile that offers a robust optical connection resistant to impacts and vibrations for applications in a rigorous environment.

The connection of the plug 21, according to the first embodiment or the second embodiment, with an optical socket, is done easily by simply and manually pushing on the plug. Maintenance of the connection is obtained by means of the MPO contacts 22. The plug 21 advantageously enters the profile of a socket to the EN4165 standard widely used in the aerospace field.

The seal at the rear of the plugs 21, according to the first embodiment or the second embodiment, can be implemented by a membrane connecting the plug body and the sheathed cables at the outlet of the MPO contacts. The flexibility of the plug 21 in the second embodiment can make it possible to achieve a seal with the socket and with the rear of the MPO contact without having to add additional seals.

Disconnection is done by simply and manually pulling on the plug 21, according to the first embodiment or the second embodiment. The MPO contacts 22 remain integral with the plug 21 after disconnection. The plug 21 is ready for a new connection if necessary. This principle, adapted to a dual-contact plug, is extended to plugs having more than one pair of contacts, such as for example the plug 210 according to a third embodiment with ten MPO contacts 22.

Figure 1:
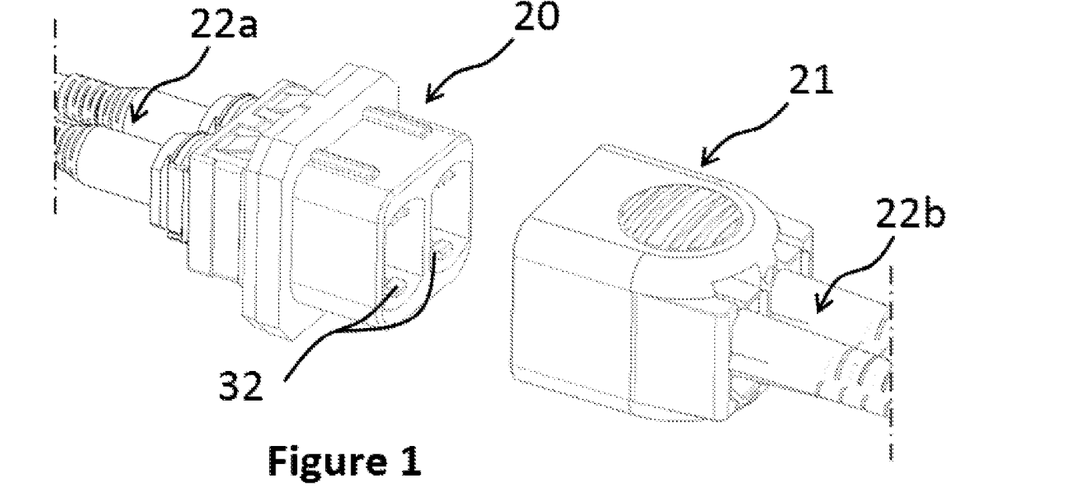
FIG. 1 shows a perspective view of a plug according to a first embodiment and of a socket that is the object of the present invention.

FIG. 1 shows a perspective view of a plug according to the first embodiment and of a socket.

The socket 20 includes two MPO contacts 22a and includes MPO adapters 32 that couple with two MPO contacts 22b mounted in the plug 21.

Each MPO adapter 32 is composed of two clips.

Figure 2:
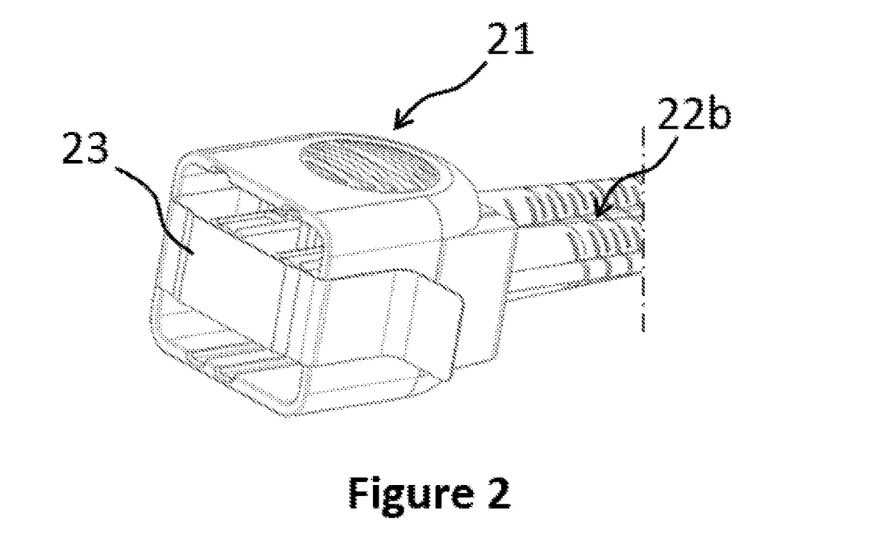
FIG. 2 shows a perspective view of a plug according to a first embodiment that is the object of the present invention.

FIG. 2 shows a perspective view of a plug according to the first embodiment equipped with an optional obturator.

The optical front face of the MT ferrules is protected by means of an "obturating" adhesive protective film 23. This film is removed "at the last moment", before the connection, by the end operator.

Figure 3:
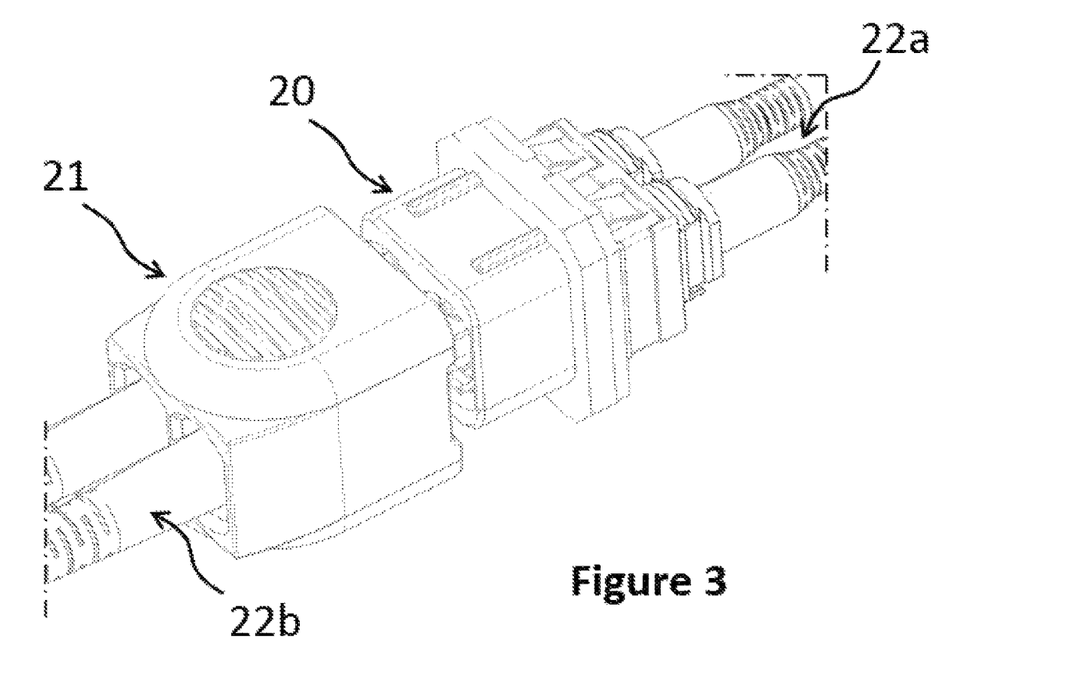
FIG. 3 shows a perspective view of a plug according to a second embodiment and of a socket that is the object of the present invention.

FIG. 3 shows a perspective view of a plug according to a second embodiment and of a socket 20. The socket 20 includes two MPO contacts 22b and the plug 21 two MPO contacts 22b.

Figure 4:
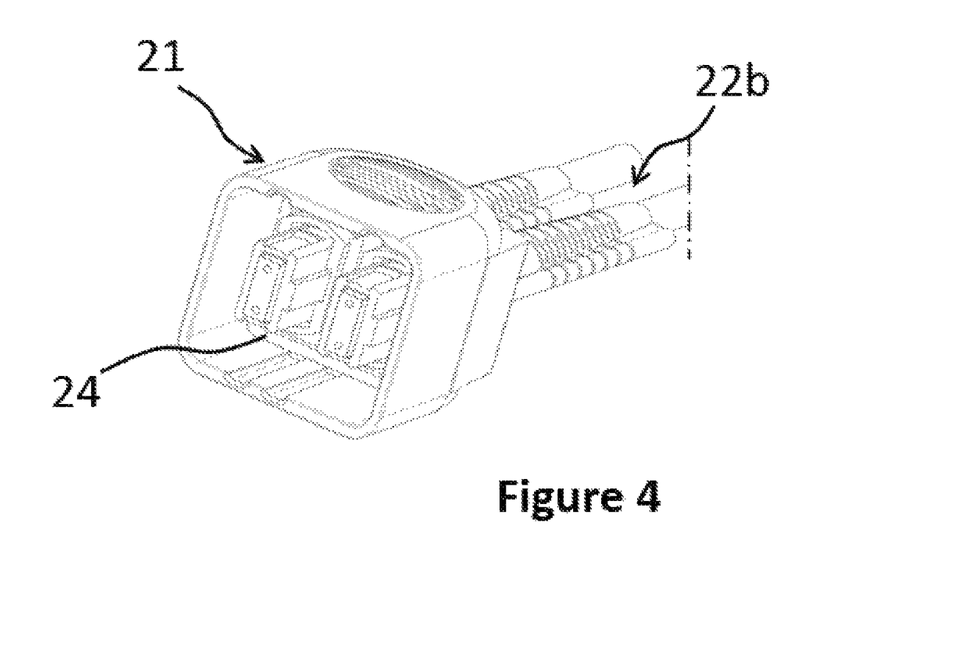
FIG. 4 shows another perspective view of a plug according to a second embodiment that is the object of the present invention.

FIG. 4 shows another perspective view of a plug according to the first embodiment.

Between the plug 21 and the socket 20 there is a seal 24 that can advantageously be molded in the plug 21 or be an additional part inserted from the other side of the insertion of the MPO contacts 22.

Figure 5:
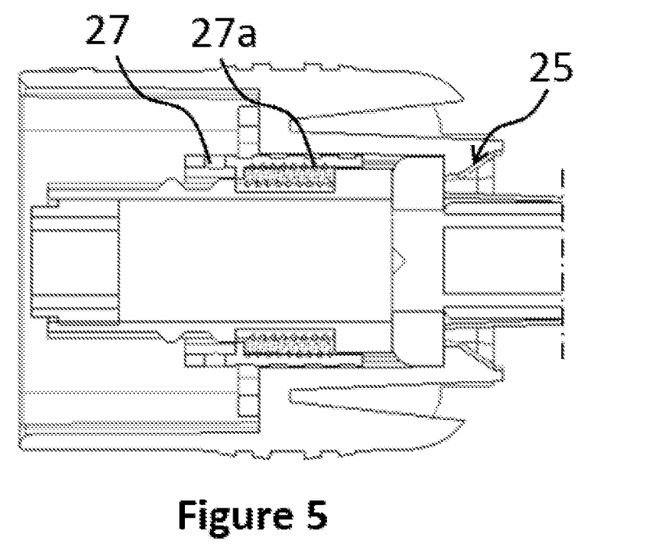
FIG. 5 shows a view in profile section of a plug according to a second embodiment.

FIG. 5 shows a view in cross section of a plug according to the first embodiment. The holding element is a retention clip 25 positioned at each axial opening.

The axial opening is adapted for allowing the frictionless translation towards the rear of the locking ring 27 of the MPO contact 22b during locking on the socket. The spring 27a returning the locking ring forward when the locking is terminated.

Figure 6:
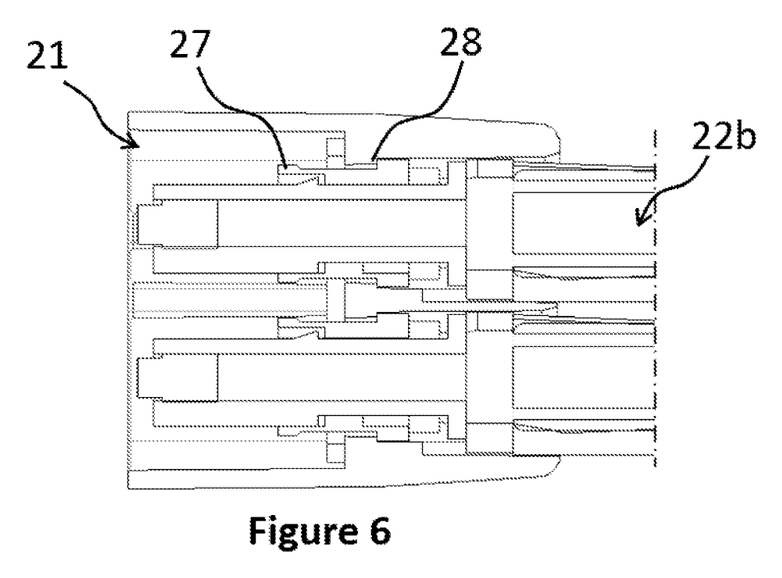
FIG. 6 shows a view in cross section from below along a mid-plane of a plug according to a second embodiment.

FIG. 6 shows a view in cross section of a plug according to the first embodiment.

In this figure, the device for implementing the forward stop of the MPO contact is shown. The axial opening of the plug 21 includes a shoulder 28.

The shoulder 28 serves as a stop and cooperates with a part of the locking ring 27 of the MPO contact 22b in order to prevent the forward translation of the end of the MPO contact 22b in the axial opening of the plug 21. Traction applied to the plug causes, because of this shoulder, the retraction of the locking rings 27 of the MPO contacts making it possible to release the retention clips situated in the socket and to allow unlocking of the MPO contacts 22b. This mechanism is stated in IEC 61754-7.

Figure 7:
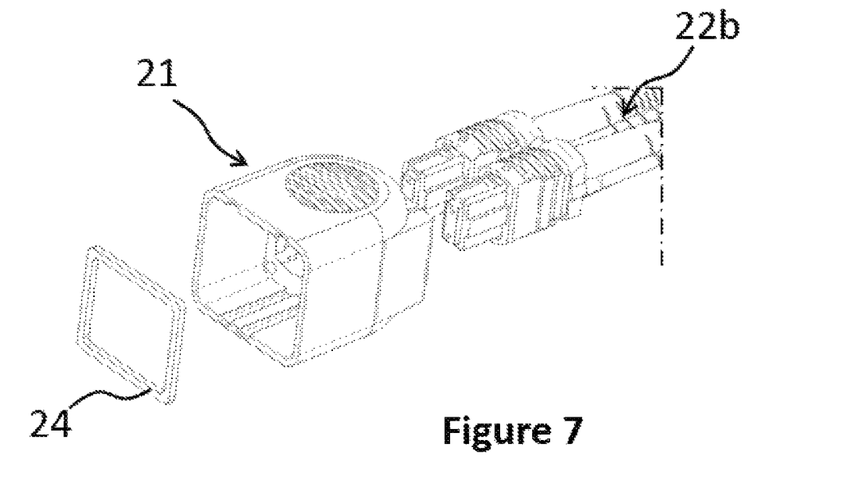
FIG. 7 shows an exploded front view of a plug according to the first embodiment.

FIG. 7 shows an exploded view of a plug according to the first embodiment.

The plug 21 includes:

through axial openings intended to receive the MPO contacts 22b;

a first positive-location element positioned in each axial opening of the plug 21 and a second positive-location element positioned on each corresponding MPO contact 22b;

an element for holding the MPO contacts 22b adapted to hold the MPO contacts 22b in the plug 21;

the plug shape 21 cooperates with the shape of the socket 20 in order to ensure coupling thereof.

The socket 20 includes elements for locking MPO contacts 22a and 22b, each MPO contact 22b of the plug 21 is locked with the corresponding MPO contact 22a in the socket 20.

A seal 24 guarantees impermeability of the connection. The seal 24 is positioned around the MPO contacts 22b of the plug and produces impermeability when the plug 21 and the socket 20 are coupled.

Figure 8:
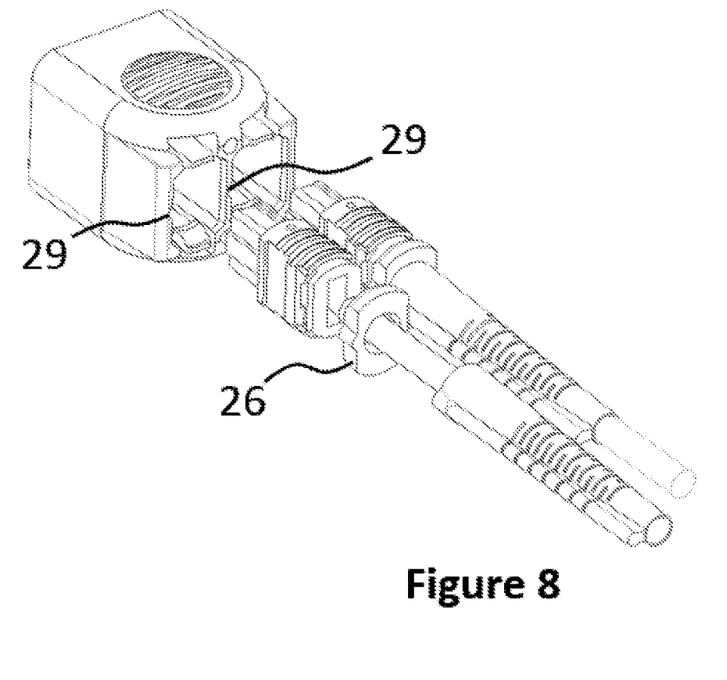
FIG. 8 shows an exploded rear view of a plug according to the first embodiment.

FIG. 8 shows an exploded view of a plug according to the first embodiment.

On the spacer 26 there is a first positive-location element. The second positive-location element 29 on each corresponding axial opening of the plug.

Figure 9:
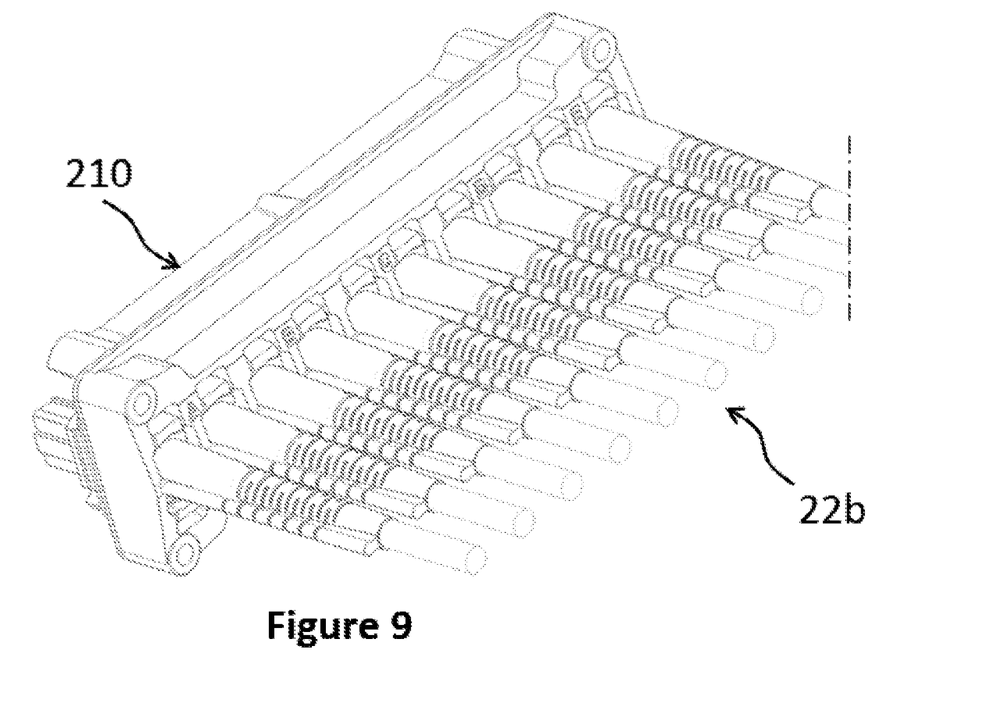
FIG. 9 shows a third embodiment with a plug including ten MPO contacts.

FIG. 9 shows a third embodiment with the plug including ten MPO contacts.

In this precise case, the clearances in the axis of the movement at the time of connection are taken up by a spacer that is thicker, but flexible with a spring effect also making it possible to provide sufficient force for the MPO contact to lock on the socket.

Figure 10:
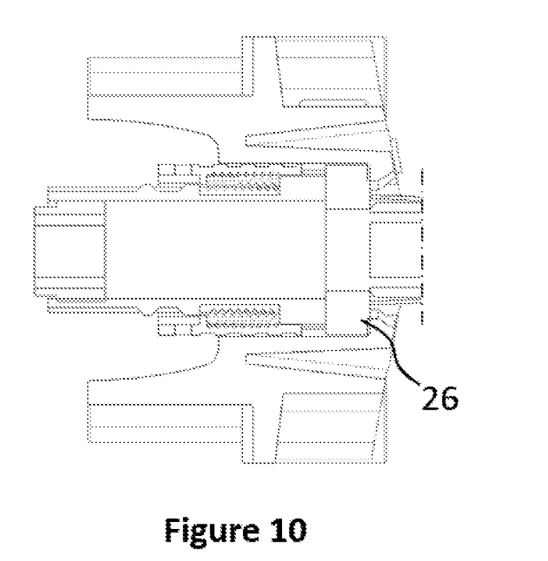
FIG. 10 shows a view in cross section of a plug according to a third embodiment.

FIG. 10 shows a view in cross section of a plug according to a third embodiment on which the spacer 26 is shown.

Figure 11:
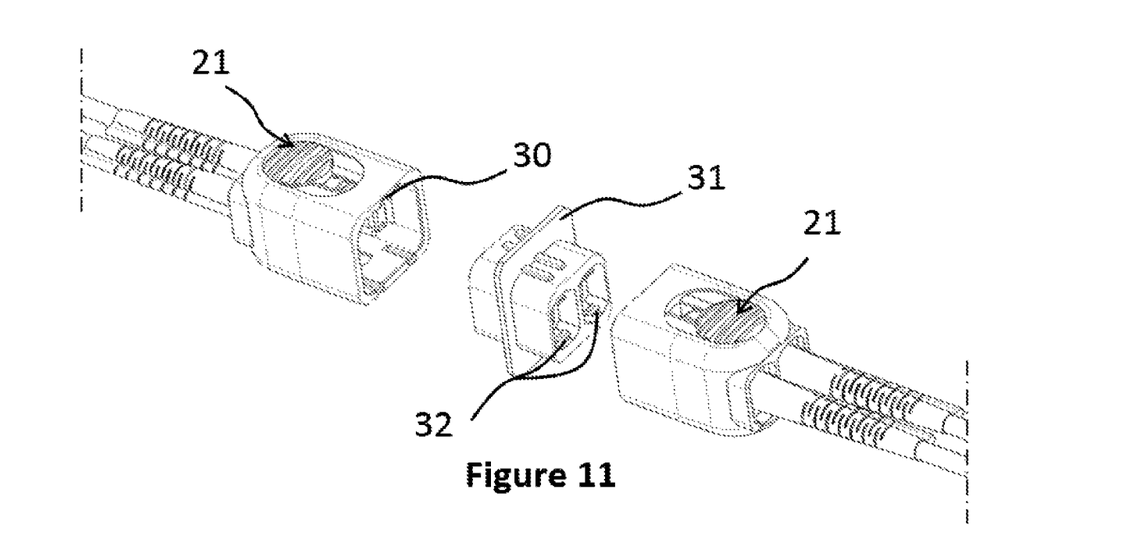
FIG. 11 shows a perspective view of a fourth embodiment.

FIG. 11 shows a fourth embodiment with a plug that includes a sliding guide.

In this precise case, the sliding guide 30 guides the plug 21 in the extension socket 31 and mechanically protects the MPO contacts when the plug is uncoupled. The sliding guide retracts during the operation of locking the MPO contacts. A return system returns it to its initial position when the MPO contacts are unlocked.

In this embodiment the extension socket 31 makes it possible to directly connect two plugs 21. The extension socket 31 includes MPO adapters 32.

In this version, the extension socket 31 includes four openings for receiving a part of each MPO contact. Each MPO contact is assembled with the facing MPO adapter. The extension socket 31 includes a separator plate, each side of which includes two openings for receiving a part of each MPO contact. The separator plate includes through holes for allowing the connection of the optical fibers to pass and for achieving the connection.

Each plug 21 includes two MPO contacts and the socket makes it possible to connect each MPO contact together in order to form, in this configuration, two MPO contact pairs.

In a variant, not shown, the extension socket includes a plurality of openings for associating the plurality of MPO contacts contained in each plug.

Figure 12:
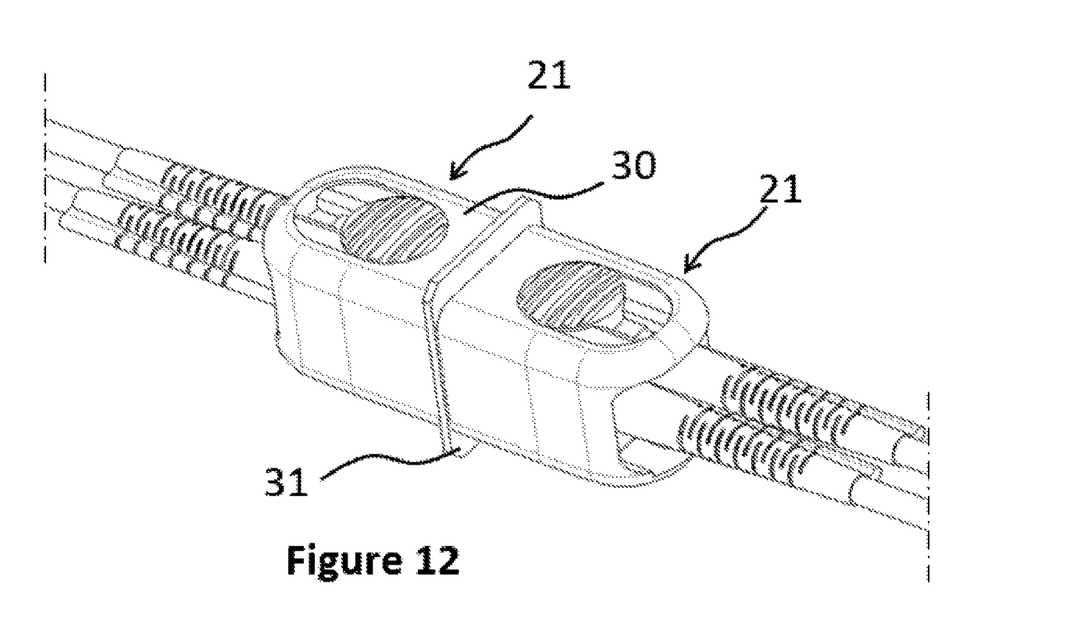
FIG. 12 shows a perspective view of the fourth embodiment when the MPO contacts are locked on an extension socket.

FIG. 12 shows two plugs in the locked position according to the fourth embodiment.

LIST OF REFERENCE SIGNS

TABLE 1

| References | Designations |
|---|---|
| 20 | socket |
| 21 | plug for two contacts |
| 210 | plug for ten contacts |
| 22 | MPO contacts |
| 23 | protective film |
| 24 | coupling seal |
| 25 | retention clip |
| 26 | spacer |
| 27 | locking ring |
| 27a | spring |
| 28 | shoulder |
| 29 | second positive-location element |
| 30 | sliding guide |
| 31 | extension socket |
| 32 | MPO adapter |

The invention claimed is:

1. An assembly to assemble an optical fiber with at least two pairs of MPO contacts, for optical contacts of the multifiber push-on type, defined in accordance with IEC 61754-7, the assembly comprises:
a socket comprising MPO contacts and MPO adapters cooperating with a plug;
the plug comprising:
through axial openings configured to receive the MPO contacts, each MPO contact of the plug comprising a spacer, a first positive-location element positioned in each axial opening of the plug and the spacer, and a second positive-location element positioned on each corresponding MPO contact;
a holding element configured to hold the MPO contacts in the plug;
a shoulder configured to simultaneously release a mechanism for unlocking the MPO contacts when a traction is exerted on the plug, a shape of the shoulder cooperates with a shoulder of a locking ring of the MPO contacts;
a shape of the plug cooperates with a shape of the socket to ensure coupling thereof and to guide the MPO contacts during coupling;
the socket comprises MPO adapters in which each MPO contact of the plug is locked with a corresponding MPO contact in the socket (20).

2. The assembly of claim 1, wherein the holding element is a retention clip molded with the plug and positioned at each axial opening.

3. The assembly of claim 1, wherein each axial opening comprises a shoulder cooperating with a part of each MPO contact of the plug to lock an end of said each MPO contact in said each axial opening of the plug, said each MPO contact comprises a locking ring positioned in said each axial opening and inserted on other insertion side of said each MPO contact to hold the MPO contacts.

4. The assembly of claim 1, wherein the first positive location is a rib and the second positive location is a recess with a shape complementary to that of the rib.

5. The assembly of claim 1, wherein the plug comprises a protective film for the MPO contacts.

6. The assembly of claim 1, wherein the plug comprises a grooved part facilitating gripping.

7. The assembly of claim 1, wherein the plug comprises a seal positioned around the MPO contacts and produces impermeability when the plug and the socket are coupled.

8. The assembly of claim 1, wherein the plug comprises a third positive-location element positioned on an external surface cooperating with a fourth positive-location element positioned on the socket.

9. The assembly of claim 1, wherein the socket comprises a separator plate, each side of which includes at least two openings configured to receive a part of a respective MPO contact of a plug.

* * * * *